US012779325B2

(12) United States Patent
Kang et al.

(10) Patent No.: US 12,779,325 B2
(45) Date of Patent: Nov. 3, 2026

(54) HAPTIC FEEDBACK CONTROL APPARATUS AND METHOD THEREOF

(71) Applicants: Hyundai Motor Company, Seoul (KR); Kia Corporation, Seoul (KR); POSTECH RESEARCH AND BUSINESS DEVELOPMENT FOUNDATION, Pohang-si (KR)

(72) Inventors: Jeong Goo Kang, Hwaseong-si (KR); Eun Soo Jo, Hwaseong-si (KR); Seung Moon Choi, Pohang-si (KR); Jun Woo Kim, Pohang-si (KR); Ji Wan Lee, Pohang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 123 days.

(21) Appl. No.: 18/820,825

(22) Filed: Aug. 30, 2024

(65) Prior Publication Data

US 2025/0195997 A1 Jun. 19, 2025

(30) Foreign Application Priority Data

Dec. 13, 2023 (KR) ........................ 10-2023-0181229

(51) Int. Cl.

| | |
|---|---|
| ***A63F 13/285*** | (2014.01) |
| ***A63F 13/54*** | (2014.01) |
| ***A63F 13/65*** | (2014.01) |
| ***A63F 13/803*** | (2014.01) |

(52) U.S. Cl.

CPC ............ *A63F 13/285* (2014.09); *A63F 13/54* (2014.09); *A63F 13/65* (2014.09); *A63F 13/803* (2014.09)

(58) Field of Classification Search

CPC ........ A63F 13/285; A63F 13/54; A63F 13/65; A63F 13/803; A63F 2300/1037; G06F 3/016; G06F 3/16

See application file for complete search history.

(56) References Cited

U.S. PATENT DOCUMENTS

| | | | | |
|---|---|---|---|---|
| 6,147,674 A * | 11/2000 | Rosenberg | ............. | G05G 9/047 345/157 |
| 8,398,570 B2 * | 3/2013 | Mortimer | .................. | B06B 1/10 601/60 |
| 11,235,709 B2 | 2/2022 | Lee et al. | | |
| 11,688,255 B2 * | 6/2023 | Lamy | ...................... | B06B 1/045 340/407.1 |
| 12,039,101 B2 * | 7/2024 | Kim | ....................... | B60K 35/26 |

(Continued)

FOREIGN PATENT DOCUMENTS

| | | |
|---|---|---|
| CN | 210728647 U | 6/2020 |
| KR | 20200138541 A | 12/2020 |

(Continued)

*Primary Examiner* — Peter J Iannuzzi

(74) *Attorney, Agent, or Firm* — Slater Matsil, LLP

(57) ABSTRACT

An embodiment haptic feedback control apparatus includes a data acquisition device, one or more processors, and a non-transitory storage device storing a program to be executed by the one or more processors, the program including instructions to obtain game data using the data acquisition device, generate a haptic signal based on the game data, and control a first actuator, a second actuator, or both the first actuator and the second actuator mounted in a seat based on the haptic signal to provide haptic feedback.

20 Claims, 14 Drawing Sheets

(56) References Cited

U.S. PATENT DOCUMENTS

| | | | | |
|---|---|---|---|---|
| 2017/0090577 | A1* | 3/2017 | Rihn | G06F 3/016 |
| 2019/0056786 | A1* | 2/2019 | Pate | G06F 3/041 |
| 2020/0377036 | A1 | 12/2020 | Lee et al. | |
| 2022/0203891 | A1 | 6/2022 | Hong | |
| 2023/0176653 | A1* | 6/2023 | Choi | G06F 3/016 345/156 |
| 2024/0066395 | A1* | 2/2024 | Armstrong | G06F 3/0346 |
| 2024/0211046 | A1* | 6/2024 | Bailey | G06F 3/016 |
| 2024/0264676 | A1* | 8/2024 | Sohn | G06F 3/0412 |
| 2024/0270275 | A1* | 8/2024 | Sharma | B62D 1/046 |

FOREIGN PATENT DOCUMENTS

| | | | |
|---|---|---|---|
| KR | 20210047674 | A | 4/2021 |
| KR | 20220094398 | A | 7/2022 |

* cited by examiner

HAPTIC FEEDBACK CONTROL APPARATUS AND METHOD THEREOF

CROSS-REFERENCE TO RELATED APPLICATIONS

This application claims the benefit of Korean Patent Application No. 10-2023-0181229, filed on Dec. 13, 2023, which application is hereby incorporated herein by reference.

TECHNICAL FIELD

The present disclosure relates to a haptic feedback control apparatus and a method thereof.

BACKGROUND

Devices with various functions are applied to vehicles with regard to the convenience, safety, interests, and the like of users. A vibration seat may be provided as one of such devices. The vibration seat may generate vibration on the seat to warn of a critical situation of the vehicle or may convert a sound source played from the vehicle into seat vibration or may interwork with a game to generate seat vibration.

When interworking with the game to generate the seat vibration, such an existing vibration seat may filter a low frequency component from an audio signal of the game and may convert the audio signal of the filtered low frequency component into a vibration signal. Because the audio signal of the game includes various sound effects, the existing vibration seat may not selectively provide a haptic signal to suit a situation. Furthermore, because the sound signal has a higher frequency band and a wider frequency band range than the frequency band capable of being output by the actuator, a plurality of pieces of information are removed when the sound signal is filtered. Thus, the existing vibration seat has a limitation in increasing the immersion of the user for the game.

SUMMARY

Embodiments of the present disclosure can solve problems occurring in the prior art while advantages achieved by the prior art are maintained intact.

An embodiment of the present disclosure provides a haptic feedback control apparatus for controlling haptic feedback output to a seat based on game data and a method thereof.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a haptic feedback control apparatus may include a data acquisition device and a processor. The processor may obtain game data using the data acquisition device, may generate a haptic signal based on the game data, and may control at least one of a first actuator or a second actuator mounted in a seat based on the haptic signal to provide haptic feedback.

The first actuator may be mounted in a back seat of the seat in a cantilever structure to output force feedback in a direction parallel to the direction of progress of a vehicle.

The first actuator may have a vibration displacement determined by a resonant frequency of a cantilever beam to which the first actuator is attached.

The second actuator may be mounted in a cushion seat of the seat to output vibration feedback in a vertical direction.

The processor may calculate an engine sound frequency using engine revolutions per minute (RPM) included in the game data, may determine vibration intensity based on the engine RPM, if the engine sound frequency is greater than or equal to a first reference frequency, and may generate a sine waveform based on the vibration intensity.

The processor may determine a vibration frequency based on the engine RPM, if the engine sound frequency is less than the first reference frequency and is greater than or equal to a second reference frequency, and may generate the sine waveform based on the vibration frequency.

The processor may generate the sine waveform based on the engine sound frequency, if the engine sound frequency is less than the second reference frequency.

The processor may limit a previously generated white noise signal to a frequency band of the engine sound frequency and may generate the haptic signal based on the limited white noise signal and the sine waveform.

The processor may calculate jerk and an acceleration magnitude using 3-axis acceleration included in the game data, may determine whether a collision occurs based on the jerk, may calculate collision intensity based on the acceleration magnitude in response to determining that the collision occurs, and may generate the haptic signal based on the collision intensity.

The processor may calculate road surface roughness using vertical axis acceleration included in the game data, may determine a signal amplitude based on the road surface roughness, and may generate the haptic signal based on the signal amplitude and a previously generated noise signal.

The processor may separate a sound source for each type from a game sound included in the game data, may generate signal waveforms based on the separated sound source, and may merge the generated signal waveforms at a predetermined ratio to generate the haptic signal.

According to another embodiment of the present disclosure, a haptic feedback control method may include obtaining game data using a data acquisition device, generating a haptic signal based on the game data, and controlling at least one of a first actuator or a second actuator mounted in a seat based on the haptic signal to provide haptic feedback.

The providing of the haptic feedback may include controlling the first actuator mounted in a back seat of the seat in a cantilever structure to output force feedback in a direction parallel to the direction of progress of a vehicle and controlling the second actuator mounted in a cushion seat of the seat to output vibration feedback in a vertical direction.

The generating of the haptic signal may include calculating an engine sound frequency using engine RPM included in the game data, determining vibration intensity based on the engine RPM, if the engine sound frequency is greater than or equal to a first reference frequency, and generating a sine waveform based on the vibration intensity.

The generating of the haptic signal may further include determining a vibration frequency based on the engine RPM, if the engine sound frequency is less than the first reference frequency and is greater than or equal to a second reference frequency, and generating the sine waveform based on the vibration frequency.

The generating of the haptic signal may further include generating the sine waveform based on the engine sound frequency, if the engine sound frequency is less than the second reference frequency.

The generating of the haptic signal may further include limiting a previously generated white noise signal to a frequency band of the engine sound frequency and generating the haptic signal based on the limited white noise signal and the sine waveform.

The generating of the haptic signal may include calculating jerk and an acceleration magnitude using 3-axis acceleration included in the game data, determining whether a collision occurs based on the jerk, calculating collision intensity based on the acceleration magnitude in response to determining that the collision occurs, and generating the haptic signal based on the collision intensity.

The generating of the haptic signal may include calculating road surface roughness using vertical axis acceleration included in the game data, determining a signal amplitude based on the road surface roughness, and generating the haptic signal based on the signal amplitude and a previously generated noise signal.

The generating of the haptic signal may include separating a sound source for each type from a game sound included in the game data, generating signal waveforms based on the separated sound source, and merging the generated signal waveforms at a predetermined ratio to generate the haptic signal.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
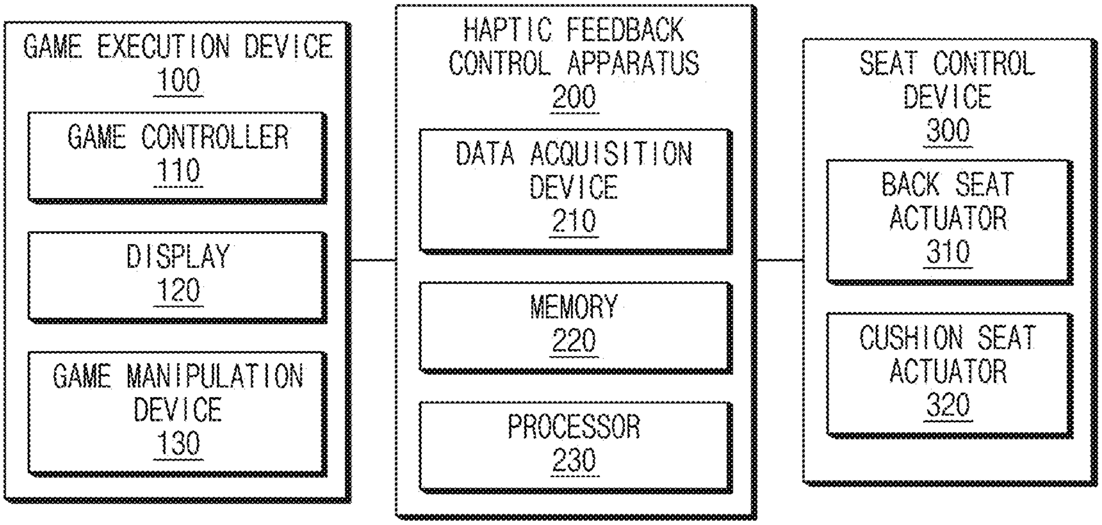
FIG. 1 is a drawing illustrating a configuration of a haptic feedback support system according to embodiments of the present disclosure.

Hereinafter, some embodiments of the present disclosure will be described in detail with reference to the exemplary drawings. In adding the reference numerals to the components of each drawing, it should be noted that the identical component is designated by the identical numerals even when they are displayed on other drawings. In addition, a detailed description of well-known features or functions will be omitted in order not to unnecessarily obscure the gist of the present disclosure.

In describing components of exemplary embodiments of the present disclosure, the terms first, second, A, B, (a), (b), and the like may be used herein. These terms are only used to distinguish one component from another component, but they do not limit the corresponding components irrespective of the order or priority of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and they are not to be interpreted as having ideal or excessively formal meanings unless clearly defined as having such in the present application.

FIG. 1 is a drawing illustrating a configuration of a haptic feedback support system according to embodiments of the present disclosure.

Referring to FIG. 1, the haptic feedback support system may include a game execution device 100, a haptic feedback control apparatus 200, and a seat control device 300, which are connected with each other over a communication network. Each of the game execution device 100, the haptic feedback control apparatus 200, and the seat control device 300 may include a communication circuit for supporting access to the communication network. The communication network may include a wireless communication circuit (e.g., a mobile communication circuit, a short range wireless communication circuit, a wireless local area network (LAN) (Wi-Fi) communication circuit, and/or a global navigation satellite system (GNSS) communication circuit) and/or a wired communication circuit (e.g., a LAN communication circuit, an Ethernet communication circuit, and/or a power line communication circuit).

The game execution device 100 may include a game controller 110, a display 120, and a game manipulation device 130. The game execution device 100 may be implemented as a controller (e.g., an infotainment terminal or the like) in a vehicle, a cloud server, an electronic device (e.g., a laptop, a smartphone, a tablet, or the like) capable of interworking with the vehicle, or the like.

The game controller 110 may execute a game such as a racing game. Such a game controller 110 may include a memory (not shown) and a processor (not shown). The memory may be a non-transitory storage medium which stores instructions executed by the processor. The memory may include a flash memory, a hard disk, a solid state disk (SSD), a random access memory (RAM), a static RAM (SRAM), a read only memory (ROM), a programmable ROM (PROM), an electrically erasable and programmable ROM (EEPROM), an erasable and programmable ROM (EPROM), and/or the like. The processor may control the overall operation of the game controller 110. The processor may include an application specific integrated circuit (ASIC), a digital signal processor (DSP), a programmable logic device (PLD), a field programmable gate array (FPGA), a central processing unit (CPU), a microcontroller, a microprocessor, and/or the like.

The game controller 110 may download a game application from an external server and may store the game application in the memory. The game controller 110 may install the game application stored in the memory in the game execution device 100. The game controller 110 may execute the game application previously installed in the game execution device 100.

The game controller 110 may obtain various pieces of metadata (or telemetry data) from the game application (or a game), while executing the game application. The game controller 110 may transmit the obtained metadata as game data to the haptic feedback control apparatus 200. For example, while executing the racing game, the game controller 110 may obtain metadata (or game data), such as engine revolutions per minute (RPM) of the vehicle, vehicle acceleration, a vehicle speed, a vehicle position, a vehicle wheel state, a steering wheel angle, and/or a game sound. The game controller 110 may transmit the obtained game data to the haptic feedback control apparatus 200 using the communication circuit.

The display 120 may display (or output) an execution screen of the game application under control of the game controller 110. The display 120 may be a display device mounted in the vehicle. The display 120 may be implemented as a liquid crystal display (LCD), a thin film transistor-LCD (TFT-LCD), an organic light-emitting diode (OLED) display, a flexible display, a three-dimensional (3D) display, a transparent display, a touch screen, and/or the like. Furthermore, the display 120 may be implemented as a head-up display (HUD)-type virtual reality (VR) device, an augmented reality (AR) device, an extended reality (XR) device, a mixed reality (MR) device, and/or the like.

The game manipulation device 130 may generate data according to manipulation of a user (e.g., a gamer). A steering wheel, an accelerator pedal, a brake pedal, and/or the like may be used as the game manipulation device 130.

The haptic feedback control apparatus 200 may include a data acquisition device 210, a memory 220, and a processor 230.

The data acquisition device 210 may receive game data in real time from the game execution device 100. The data acquisition device 210 may receive the game data transmitted from the game controller 110 using the communication circuit.

The memory 220 may store a haptic signal generation algorithm for each haptic effect, a haptic feedback algorithm, and the like. The memory 220 may store setting information predetermined by a designer and/or a user. The memory 220 may store the game data obtained in real time by the data acquisition device 210. The memory 220 may be a non-transitory storage medium which stores instructions executed by the processor 230. The memory 220 may include a flash memory, a hard disk, an SSD, a RAM, an SRAM, a ROM, a PROM, an EEPROM, an EPROM, and/or the like.

The processor 230 may control the overall operation of the haptic feedback control apparatus 200. The processor 230 may include an ASIC, a DSP, a PLD, an FPGA, a CPU, a microcontroller, a microprocessor, and/or the like.

The processor 230 may process the game data. The processor 230 may scale a range of the game data, may extract information of a specific frequency band from the game data, or may select data for specific event detection.

The processor 230 may generate a haptic signal based on the game data. The processor 230 may generate a haptic signal using the haptic signal generation algorithm for each haptic effect, which is stored in the memory 220. The processor 230 may input the game data to the haptic signal generation algorithm for each haptic effect. The game data input to the haptic signal generation algorithm for each haptic effect may be previously selected by a system designer. The haptic signal generation algorithm for each haptic effect may generate a haptic signal based on the received game data.

Furthermore, the processor 230 may scale (or amplify) a waveform of the generated haptic signal to a voltage range mapped to actuator(s) 310 and/or 320, which will be described below, with regard to specification(s) of the actuator(s) 310 and/or 320. The configuration in which the processor 230 embeds the amplification function is described in the present embodiment, but it is not limited thereto. A configuration may be given such that an amplifier independent of the processor 230 is provided. When the amplifier is separately configured, the processor 230 may scale the waveform of the haptic signal with regard to the specification of the amplifier. The amplifier may scale the waveform of the haptic signal output from the processor 230 to the voltage range mapped to the actuator(s) 310 and/or 320 with regard to the specification(s) of the actuator(s) 310 and/or 320.

The seat control device 300 may output haptic feedback based on the haptic signal output from the haptic feedback control apparatus 200. The haptic feedback may include force feedback and/or vibration feedback. Such a seat control device 300 may include a back seat actuator 310 and a cushion seat actuator 320. Each of the back seat actuator 310 and the cushion seat actuator 320 may include at least one vibrator.

The back seat actuator 310 may be formed in a cantilever structure or the like. The back seat actuator 310 may output force feedback. The force feedback may provide a user with the feeling of hitting. The force feedback may be output in a situation such as a collision event or gear shift.

The cushion seat actuator 320 may provide the user with vibration feedback. The vibration feedback may be haptic feedback associated with vehicle driving vibration, wind noise, engine vibration, and the like.

Figure 2:
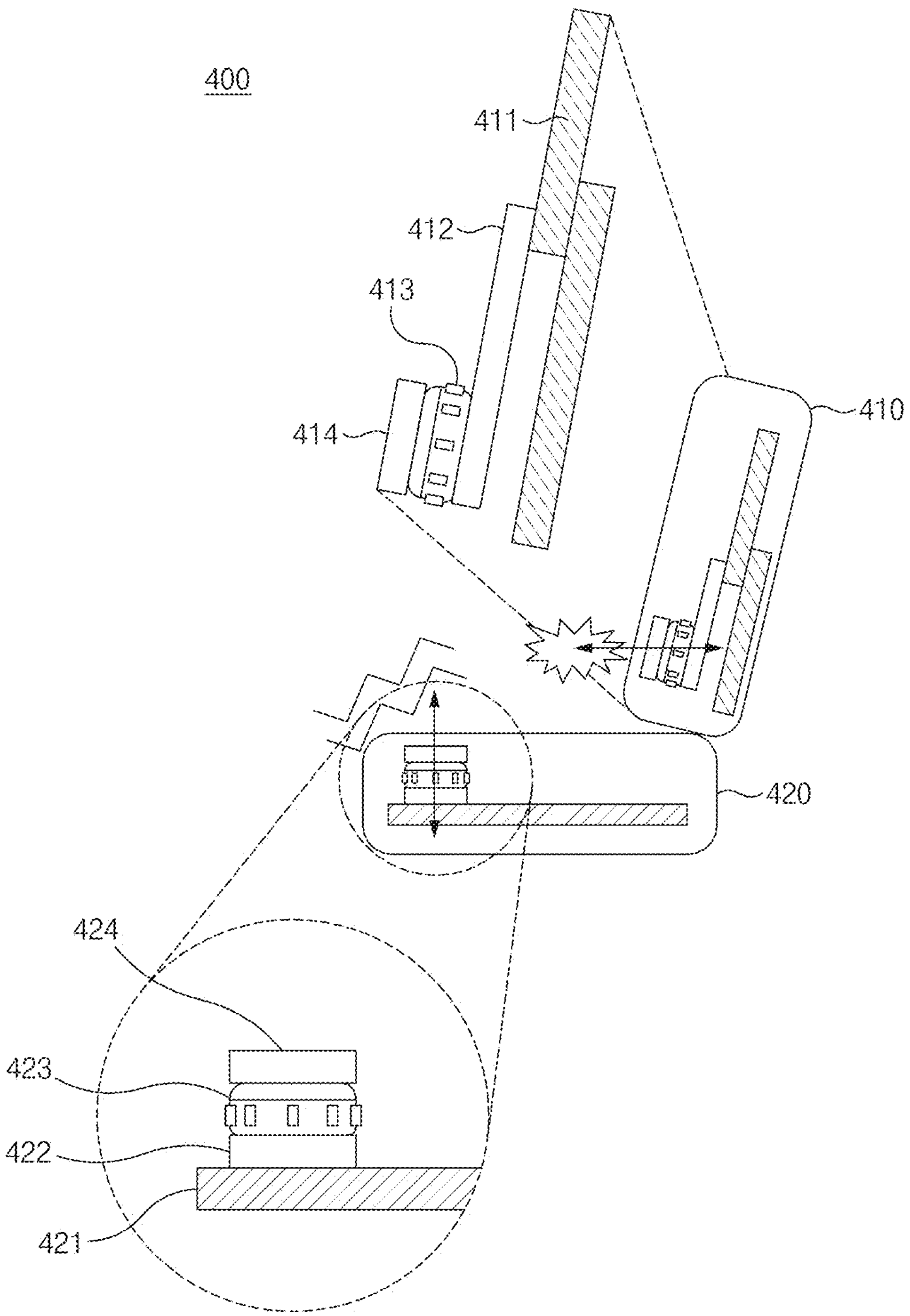
FIG. 2 is a drawing illustrating a seat structure according to embodiments of the present disclosure.

FIG. 2 is a drawing illustrating a seat structure according to embodiments of the present disclosure.

A seat 400 may include a back seat 410 and a cushion seat 420.

The back seat 410 may include a first seat frame 411, a cantilever beam 412, a first actuator 413, and a first cushion pad 414.

The first seat frame 411 may be a framework of the back seat 410, which may be made of a pipe, a wire, a metal, a plastic plate, and/or the like.

The cantilever beam 412 may be fastened to the seat frame 411 through bolting. The cantilever beam 412 may have hard and highly elastic properties. Such a cantilever beam 412 may be made of a metal material, such as iron or aluminum.

The first actuator 413 may be a vibration actuator (or a vibrator) which generates vibration. The first actuator 413 may correspond to the back seat actuator 310 shown in FIG. 1. The first actuator 413 may be attached to the cantilever beam 412 using a double-sided tape or an adhesive. A linear resonance actuator, a voice coil motor, a piezo-electric actuator, an electro-active polymer based actuator, or the like may be used as the first actuator 413.

The first actuator 413 may provide the user with force feedback in a direction parallel to the direction of progress of a vehicle. The first actuator 413 may be used when providing force feedback in the form of an impact, such as a vehicle collision in a game or a shift shock in the game.

When the first actuator 413 is excited, the vibration displacement of the first actuator 413 may be maximized by a resonant frequency of the cantilever beam 412 to provide the user with the feeling of hitting in the form of an impact (or force feedback). In other words, the vibration displacement of the first actuator 413 may be determined by the resonant frequency of the cantilever beam 412.

The resonant frequency W of the cantilever beam 412 may be represented as Equation 1 below.

$$W = \left[\frac{k}{\{Cm + M\}}\right]^{1/2} \quad \text{Equation 1}$$

Herein, k denotes the stiffness of the beam, C denotes the proportional constant determined according to the structure of the beam, m denotes the mass of the beam, and M denotes the actuator mass.

The mass m of the beam may be represented as Equation 2 below.

$$m = \rho \times A \times L \quad \text{Equation 2}$$

Herein, ρ denotes the density of the beam, A denotes the cross-sectional area of the beam, and L denotes the length of the beam.

The resonant frequency W of the cantilever beam 412 may be changed by adjusting the material and length of the beam.

The first cushion pad 414 may be disposed on the top of the first actuator 413. The first cushion pad 414 may be made of a material with flexible and soft properties to minimize a foreign body sensation felt when the user sits on the seat 400. For example, the first cushion pad 414 may be made of a material such as rubber, silicone, or porous foam.

The cushion seat 420 may include a second seat frame 421, a ground pad 422, a second actuator 423, and a second cushion pad 424.

The second seat frame 421 may be a framework of the cushion seat 420, which may be made of a pipe, a wire, a metal, a plastic plate, and/or the like.

The ground pad 422 may be fastened to the second seat frame 421 through bolting. The ground pad 422 may be made of a metal material, such as iron and/or aluminum, having hard and highly elastic properties.

The second actuator 423 may be a vibration actuator (or a vibrator) which generates and outputs vibration in a vertical (or horizontal) direction. In other words, the second actuator 423 may output vibration feedback in a vertical direction with respect to an upper surface of the cushion seat 420. The second actuator 423 may correspond to the cushion seat actuator 320 shown in FIG. 1. The second actuator 423 may provide the user with a driving environment and engine vibration feedback through the vibration feedback in the vertical direction.

A linear resonance actuator, a voice coil motor, a piezo-electric actuator, an electro-active polymer based actuator, or the like may be used as the second actuator 423. The second actuator 423 may be attached to the ground pad 422 using a double-sided tape or an adhesive.

The second cushion pad 424 may be attached to the second actuator 423 using the double-sided tape or the adhesive. The second cushion pad 424 may be made of a material with flexible and soft properties to minimize a foreign body sensation felt when the user sits on the seat 400. For example, the second cushion pad 424 may be made of a material such as rubber, silicone, or porous foam.

According to the above-mentioned embodiment, the vibration actuator may be mounted on the back seat in the cantilever structure and the vibration actuator may be mounted on the cushion seat to output the vibration in the vertical direction, thus simultaneously providing two types of haptic feedback, that is, force feedback and vibration feedback.

Figure 3:
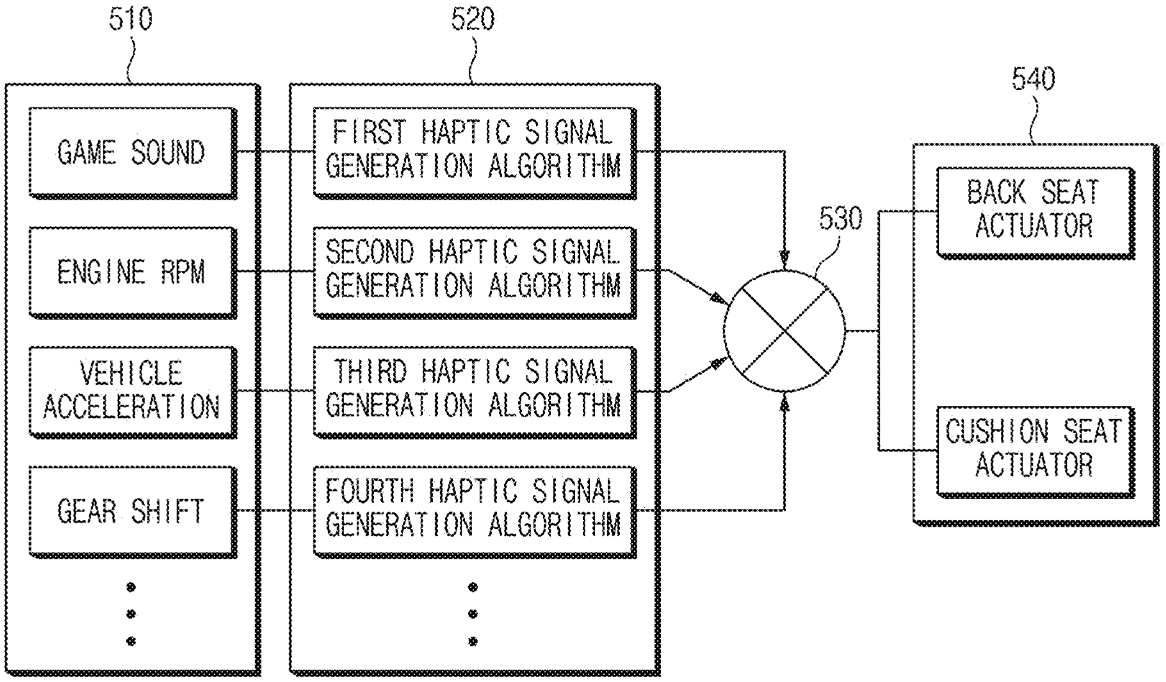
FIG. 3 illustrates a conceptual diagram of a haptic feedback algorithm according to embodiments of the present disclosure.

FIG. 3 illustrates a conceptual diagram of a haptic feedback algorithm according to embodiments of the present disclosure.

The processor 230 included in the haptic feedback control apparatus 200 may execute a haptic feedback algorithm. The processor 230 may generate a haptic signal through game data acquisition 510, haptic signal generation 520, haptic signal merging 530, and actuator selection 540 depending on the haptic feedback algorithm.

In the game data acquisition 510, the processor 230 may obtain game data (or metadata) from a game. The game data may include metadata, such as a game sound, engine RPM, vehicle acceleration, gear shift, a vehicle speed, a vehicle position, a vehicle wheel state, and/or a steering wheel angle.

In the haptic signal generation 520, the processor 230 may generate the haptic signal based on the obtained game data. The processor 230 may process the obtained game data and may input the processed game data to a haptic signal generation algorithm for each haptic effect. The processor 230 may generate a haptic signal based on the processed game data using the haptic signal generation algorithm for each haptic effect. The haptic signal generation algorithm for each haptic effect may generate a haptic signal for implementing a haptic effect (or a target effect) intended by a designer. The game data input to the haptic signal generation algorithm for each haptic effect may be previously selected by the designer.

As an example, when providing an engine effect according to engine RPM of a vehicle as the haptic effect, the processor 230 may select (or extract) the engine RPM from the obtained game data. The processor 230 may generate a haptic signal based on the selected engine RPM using a first haptic signal generation algorithm.

As another example, when providing a road surface effect according to a road surface as the haptic effect, the processor 230 may select vehicle acceleration, a vehicle wheel state, suspension travel, and/or the like from the obtained game data. The processor 230 may generate a haptic signal based on the selected vehicle acceleration, the selected vehicle wheel state, the selected suspension travel, and/or the like using a second haptic signal generation algorithm.

As another example, when providing a collision effect as the haptic effect, the processor 230 may select metadata associated with vehicle dynamics, such as vehicle acceleration, from the obtained game data. The processor 230 may generate a haptic signal based on the metadata associated with the selected vehicle dynamics using a third haptic signal generation algorithm.

As another example, when providing a sound-based effect as the haptic effect, the processor 230 may extract a game sound from the obtained game data. The processor 230 may generate a haptic signal based on the extracted game sound using a fourth haptic signal generation algorithm.

The processor 230 may scale the range of the selected game data, may filter information of a specific frequency band from the selected game data, or may use the selected game data for specific event detection.

In the haptic signal merging 530, the processor 230 may merge the generated haptic signals. As an example, the processor 230 may simply sum the generated haptic signals. As another example, the processor 230 may assign a weight to each of the generated haptic signals and may sum the haptic signals to which the weight is applied. At this time, the weight may be fixed for each haptic signal or may vary over time. As another example, when using full performance of the actuator to implement a collision effect, the processor 230 may output only the haptic signal for the collision effect and may ignore (or fail to output) the remaining haptic signals.

Furthermore, because the intended haptic effect may not be achieved as the haptic signals cancel each other out due to their signal characteristics when merging the haptic signals, the processor 230 may merge the haptic signals with regard to it.

In the actuator selection 540, the processor 230 may select an actuator (e.g., a back seat actuator and/or a cushion seat actuator) to output the generated or merged haptic signal. The processor 230 may determine a waveform of a haptic signal for each actuator. The processor 230 may scale the waveform of the haptic signal to a voltage range mapped to the actuator. The processor 230 may transmit the scaled haptic signal to the actuator.

Figure 4A:
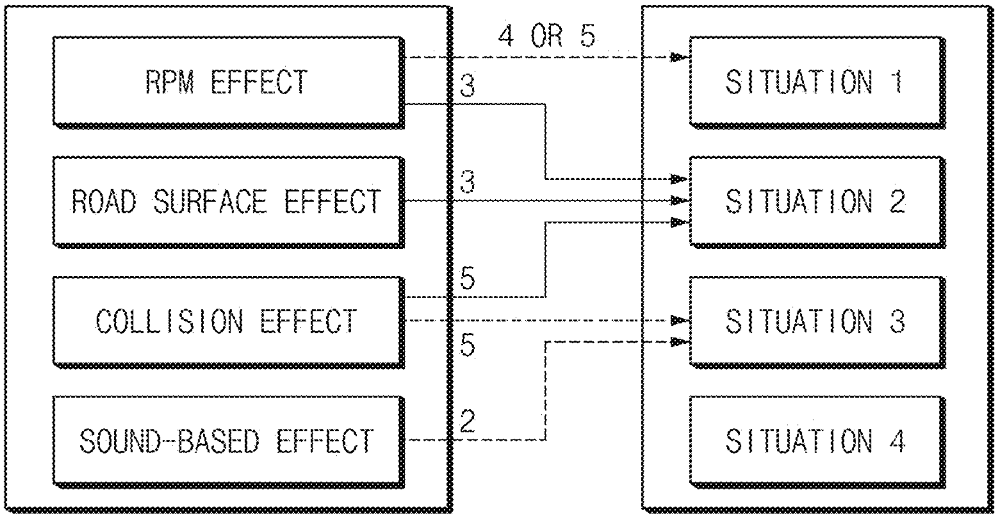
FIGS. 4A and 4B are drawings illustrating an example of applying a weight to a haptic signal generation algorithm according to embodiments of the present disclosure.
Figure 4B:
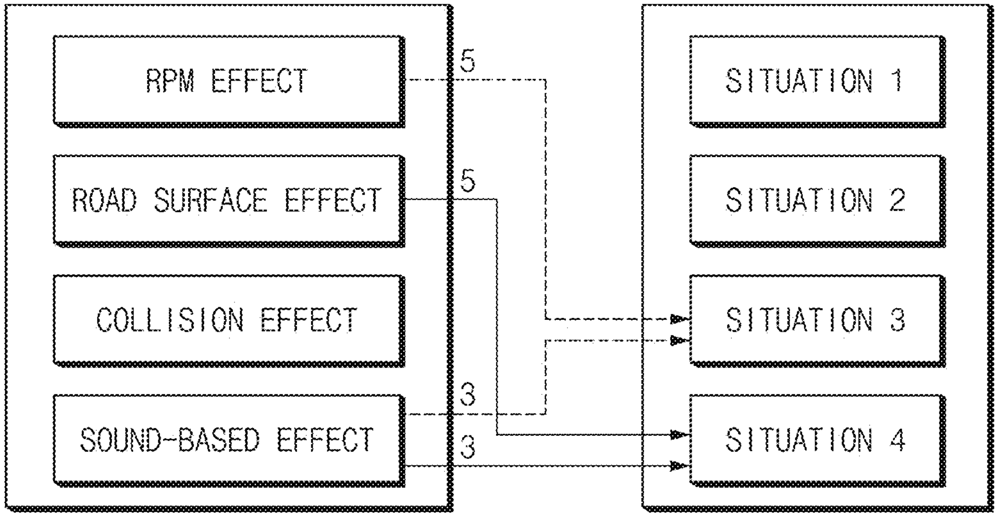

FIGS. 4A and 4B are drawings illustrating an example of applying a weight to a haptic signal generation algorithm according to embodiments of the present disclosure.

A user may provide a weight to a haptic signal generated by a haptic signal generation algorithm and may selectively personalize the haptic signal to suit a situation, thus using haptic feedback. The user may access a haptic feedback setting menu using a user interface (e.g., a touch screen). The user may assign a weight for each haptic effect on the haptic feedback setting menu. The user may assign (or allocate) a high weight to signals associated with an effect he or she wants to emphasize and may assign a low weight to signals corresponding to an effect he or she wants to degrade or ignore. At this time, the range of the weight may be set according to a detailed degree the user wants to adjust. For example, the range of the weight may be set from “0” (or no effect) to “5” (or maximum effect).

A processor 230 may apply the weight for each haptic effect, which is set by the user, to a haptic signal for implementing the haptic effect. The processor 230 may set a weight for each haptic effect for each situation, based on data input by the user. The situation may be variously set by the user. For example, the situation may include a racing game practice situation, a driving practice situation, an intense game situation, a road trip situation, and the like.

When the situation is the racing game practice situation (or situation 1), the user may select a specific haptic effect alone to improve a racing game ability. As an example, the user may use only a collision effect alone to prevent frequent collisions which occur during racing. As another example, when the user wants to step less on an unpaved road such as grass, he or she may use only a road surface effect alone. As another example, when the user wants to improve speed adjustment, he or she may use only an RPM effect (or an engine effect). To this end, as shown in FIG. 4A, the user may set only the weight of the RPM effect to “4” or “5” and may set the remaining haptic effects to “0”.

When the situation is the driving practice situation (or situation 2), the user may want to experience the same vibration as an actual situation to obtain a basic driving experience before actually driving a vehicle. In this case, as shown in FIG. 4A, the user may set each of the road surface effect and the RPM effect to about “3” and may set the collision effect to “5”. At this time, because vibration is able to vary with a vehicle, the user may slightly adjust the step.

When the situation is the intense game situation (or situation 3), the user may want to receive an intense vibration effect for a game regardless of actual vehicle vibration. Because vibration the user expects from the game varies for each user, settings may vary. For example, when the user wants a haptic effect for a game background sound, a tire, or a collision, as shown in FIG. 4A, he or she may set a sound-based effect and a collision effect to “2” and “5”, respectively. Alternatively, when the user wants a haptic effect for speeding which is difficult to enjoy in real life from a game, as shown in FIG. 4B, he or she may set an RPM effect capable of improving a sense of speed to “5” and may set an effect on a wind sound, that is, a sound-based effect to “3”.

When the situation is the road trip situation (or situation 4), the user may want to use a haptic effect for emphasizing the bump of an unpaved road when traveling by car. In this case, referring to FIG. 4B, the user may set a road surface effect to “5” and may set a sound-based effect in which the wind sound and the sound of small rocks bouncing on the ground are reflected to “3”.

Figure 5:
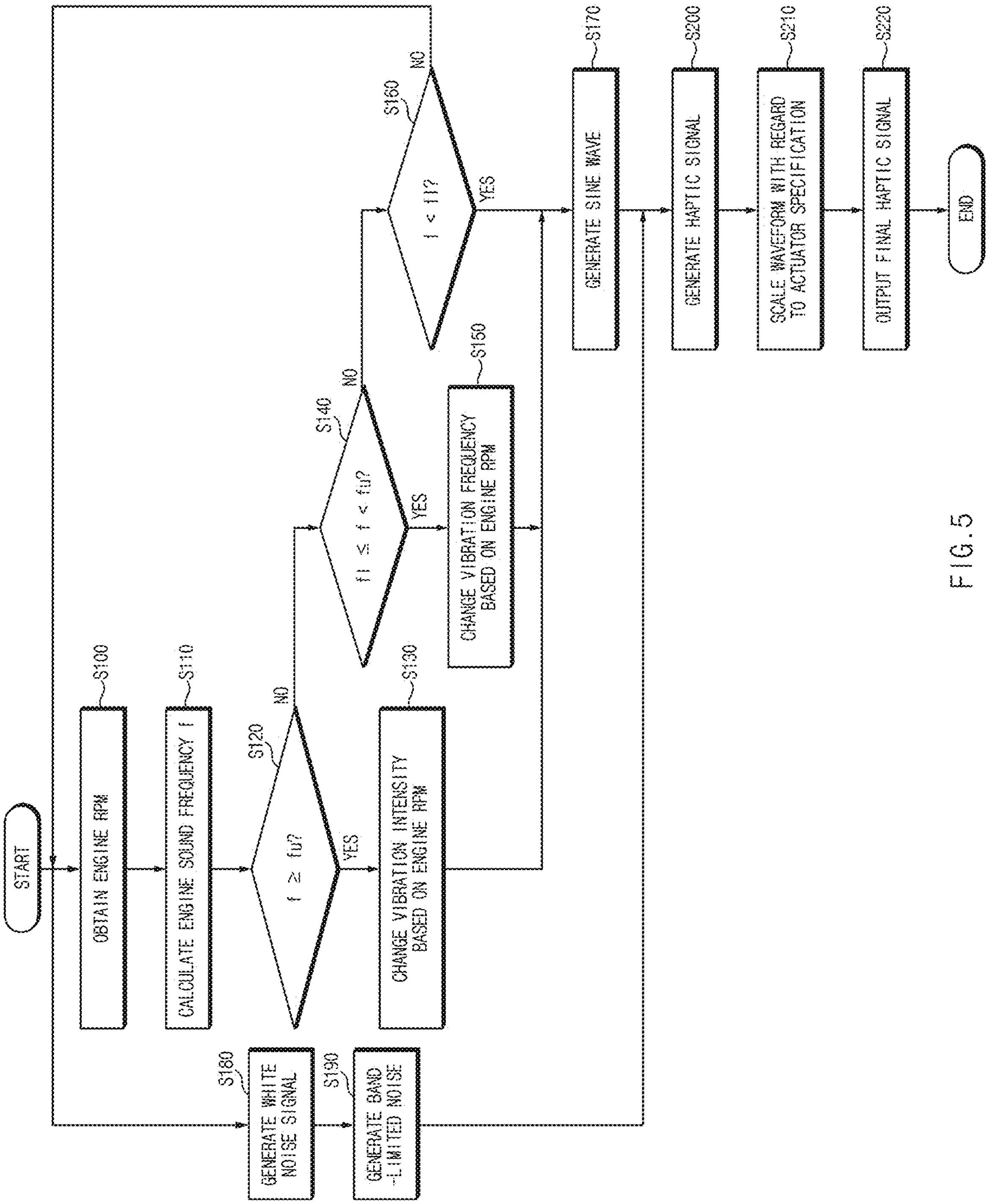
FIG. 5 is a flowchart illustrating a method for generating a haptic signal for a vehicle engine effect according to embodiments of the present disclosure.

FIG. 5 is a flowchart illustrating a method for generating a haptic signal for a vehicle engine effect according to embodiments of the present disclosure.

The processor 230 of the haptic feedback control apparatus 200 may generate a haptic signal using a first haptic signal generation algorithm for mapping engine RPM to a frequency or intensity of a vibration signal.

First of all, in S100, the processor 230 may obtain the engine RPM. The processor 230 may obtain the engine RPM, which is game data, from the game execution device 100.

In S110, the processor 230 may calculate an engine sound frequency f based on the engine RPM. In other words, the processor 230 may convert the engine RPM into the engine sound frequency f. The engine sound frequency (or an engine sound-based frequency) f may be set in proportion to an engine sound main order frequency fm. The engine sound main order frequency fm may be represented as Equation 3 below.

$$fm = \frac{RPM}{60} * \frac{N}{2} \quad \text{Equation 3}$$

Herein, N denotes the number of engine cylinders.

In S120, the processor 230 may determine whether the calculated engine sound frequency f is greater than or equal to a predetermined first reference frequency fu. The first reference frequency fu may be set based on an actuator specification (i.e., a vibrator specification), which may be a maximum frequency capable of being generated by a vibrator.

When it is determined that the calculated engine sound frequency f is greater than or equal to the first reference frequency fu, in S130, the processor 230 may change (or determine) vibration intensity (or an amplitude of a vibration signal) based on the engine RPM. As the engine RPM increases, the processor 230 may increase vibration intensity (or amplitude). At this time, the processor 230 may map vibration intensity corresponding to the engine RPM using a power function. Due to this, when using the power function according to the engine RPM, the processor 230 may provide a more dynamic haptic stimulation change than linear mapping.

When the calculated engine sound frequency f is less than the first reference frequency fu, in S140, the processor 230 may determine whether the calculated engine sound frequency f is greater than or equal to a second reference frequency fl. The second reference frequency fl may be set based on the actuator specification, which a minimum frequency which is smaller than the first reference frequency fu and is capable of being generated by the vibrator.

When it is determined that the calculated engine sound frequency f is greater than or equal to the second reference frequency fl, in S150, the processor 230 may change (or determine) a vibration frequency based on the engine RPM. As the engine RPM increases, the processor 230 may increase the vibration frequency.

When it is determined that the calculated engine sound frequency f is less than the second reference frequency fl in S160, in S170, the processor 230 may generate a sine wave s. The processor 230 may generate a sine waveform (i.e., an initial haptic signal) based on the vibration intensity determined in S130. Furthermore, the processor 230 may generate the sine waveform based on the vibration frequency determined in S150. Furthermore, the processor 230 may generate the sine waveform based on the engine sound frequency f.

When starting to generate the haptic signal, in S180, the processor 230 may generate a white noise signal. It is disclosed in the present embodiment that the processor 230 generates the white noise signal when executing the first haptic signal generation algorithm, but it is not limited thereto. The processor 230 may generate the white noise signal before executing the first haptic signal generation algorithm. The processor 230 may generate the white noise signal based on a noise sampling rate.

In S190, the processor 230 may generate (or calculate) band-limited noise n based on the white noise signal. The processor 230 may convert the white noise signal into noise limited to a nearby frequency band of the engine sound frequency f, that is, band-limited white noise.

In S200, the processor 230 may generate a haptic signal using the sine wave and the white noise signal. As an example, the processor 230 may generate a final haptic signal sf (=s+n) using the sine wave s and the band-limited noise n. In other words, the processor 230 may apply noise to the sine wave to reduce noise by the haptic effect depending on a situation. As such, the processor 230 may reduce an artificial sense of difference of the vibration signal of the sine wave using the generated noise. As another example, the processor 230 may omit the process of calculating the band-limited noise n and may generate a haptic signal sf (=s) using the sine wave s.

In S210, the processor 230 may scale a waveform of the haptic signal with regard to an actuator specification. The processor 230 may scale the waveform of the haptic signal to a voltage range mapped to the actuator.

In S220, the haptic feedback control apparatus 200 may output the scaled haptic signal as a final haptic signal.

According to the above-mentioned embodiment, the haptic feedback control apparatus 200 may allow a user to feel changes in vehicle engine RPM in real time and recognize all situations where the engine RPM changes, such as gear shift, through the haptic signal, although he or she does not pay special attention.

Figure 6:
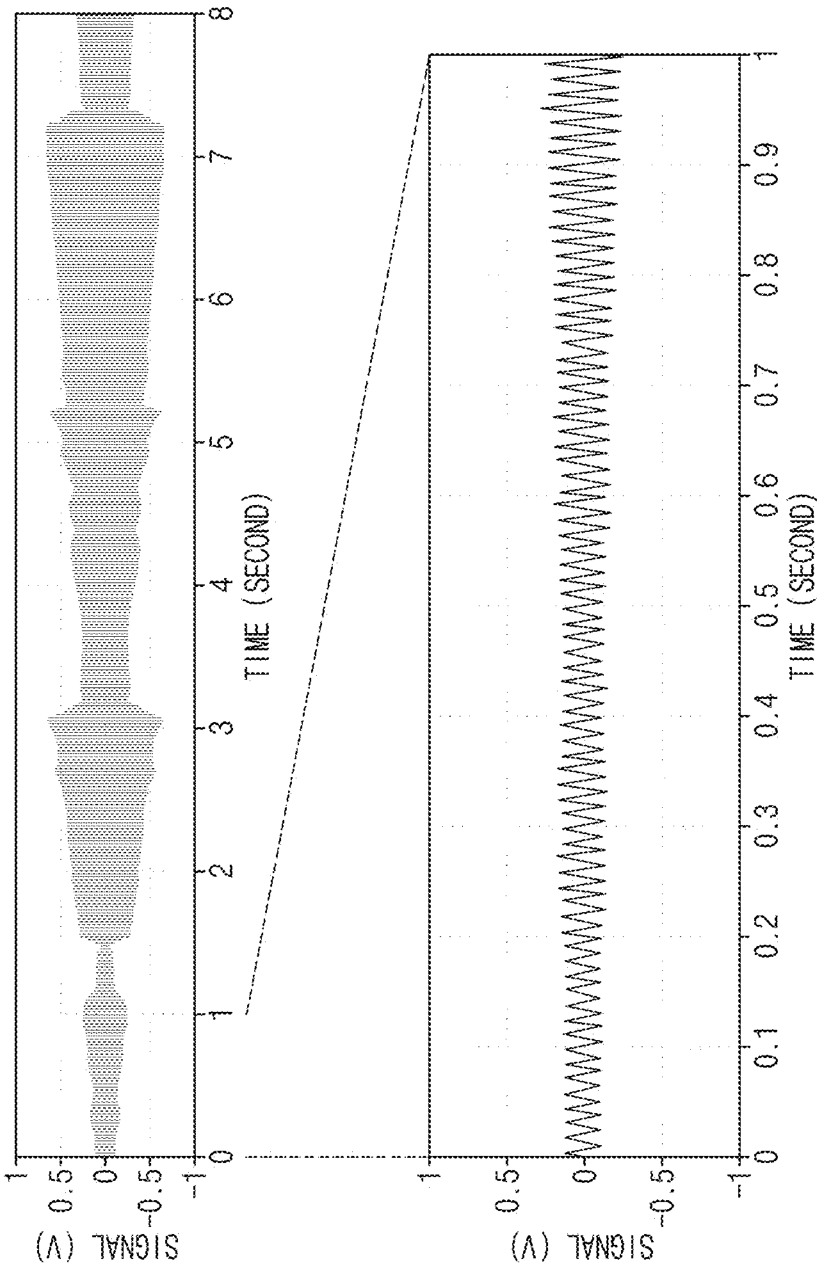
FIG. 6 is a drawing illustrating a haptic signal for a vehicle engine effect according to embodiments of the present disclosure.

FIG. 6 is a drawing illustrating a haptic signal for a vehicle engine effect according to embodiments of the present disclosure.

In a situation where gear shift occurs near 1 second, 3 seconds, and 7 seconds as a user continuously presses the accelerator pedal, a haptic feedback control apparatus 200 may output a haptic signal with a waveform like FIG. 6. The haptic feedback control apparatus 200 may reflect 20% of band filter noise in the waveform when generating the haptic signal. Because the frequency of a sine wave is greater than or equal to an actuator resonant frequency, 70 Hz, the haptic feedback control apparatus 200 may change an amplitude (or vibration intensity) of the haptic signal as the engine RPM increases.

Figure 7:
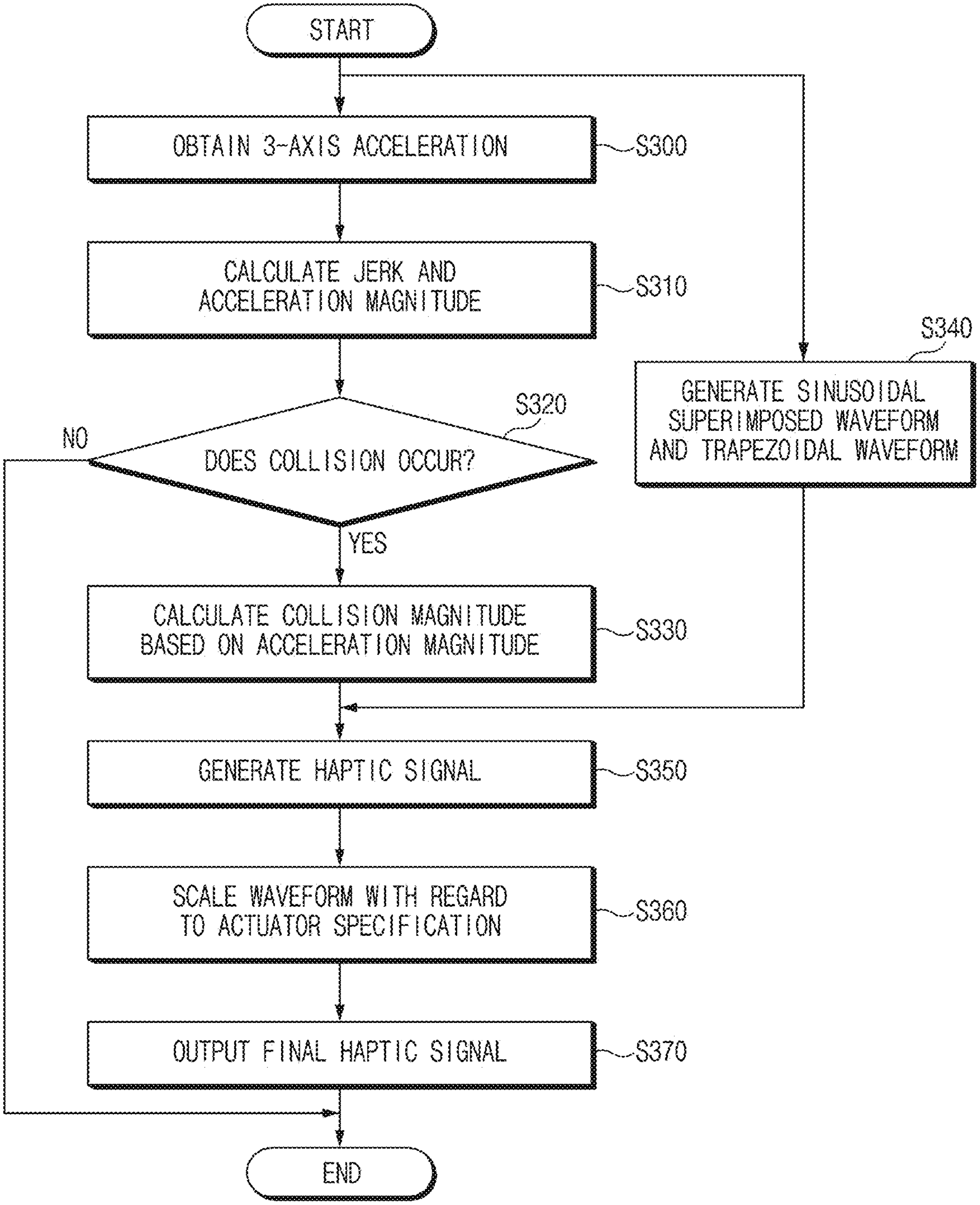
FIG. 7 is a flowchart illustrating a process of generating a haptic signal for a collision effect according to embodiments of the present disclosure.

FIG. 7 is a flowchart illustrating a process of generating a haptic signal for a collision effect according to embodiments of the present disclosure.

The haptic feedback control apparatus 200 may generate a haptic signal using a second haptic signal generation algorithm for generating a haptic signal for a collision using vehicle dynamics data, such as vehicle acceleration and a vehicle speed.

In S300, the processor 230 of the haptic feedback control apparatus 200 may obtain the 3-axis acceleration of a vehicle. The processor 230 may obtain the 3-axis acceleration as game data from the game execution device 100.

In S310, the processor 230 may calculate jerk and an acceleration magnitude using the 3-axis acceleration.

In S320, the processor 230 may determine whether a collision occurs using the jerk and/or the acceleration magnitude. For example, when the jerk and/or the acceleration magnitude are/is greater than a predetermined threshold, the processor 230 may determine that the collision occurs.

When it is determined that the collision occurs, in S330, the processor 230 may calculate a collision magnitude (or collision intensity) based on the acceleration magnitude. The processor 230 may determine an amplitude (or vibration intensity) of the haptic signal based on the acceleration magnitude.

In S340, the processor 230 may generate a sinusoidal superimposed waveform and a trapezoidal waveform. In other words, the processor 230 may generate an initial haptic signal with the sinusoidal superimposed waveform and the trapezoidal waveform. A trapezoidal waveform, a Gaussian waveform, a skewed Gaussian waveform, a triangular waveform, or the like may be used as the waveform of the haptic signal for collision expression. Particularly, the trapezoidal waveform may be effective to reduce a perceived delay between a collision time point and a haptic playback time point.

In S350, the processor 230 may generate a haptic signal using the calculated collision magnitude and the generated waveform.

In S360, the processor 230 may scale a waveform of the haptic signal with regard to an actuator specification.

In S370, the processor 230 may output the scaled haptic signal as a final haptic signal.

As another embodiment, when representing a larger collision intensity than the intensity capable of being represented using the actuator, the processor 230 may increase a signal length along a time axis to increase perceived vibration intensity. As such, a user may recognize vibration at larger intensity than that before increasing the signal length along the time axis depending on a temporal summation characteristic.

As another embodiment, the processor 230 may simultaneously drive a first actuator 413 and a second actuator 423 and may expand a vibration stimulation portion (or a portion receiving vibration) to increase perceived vibration intensity. Due to this, the user may recognize vibration at larger intensity than that before expanding the stimulation portion depending on a spatial summation characteristic.

Figure 8:
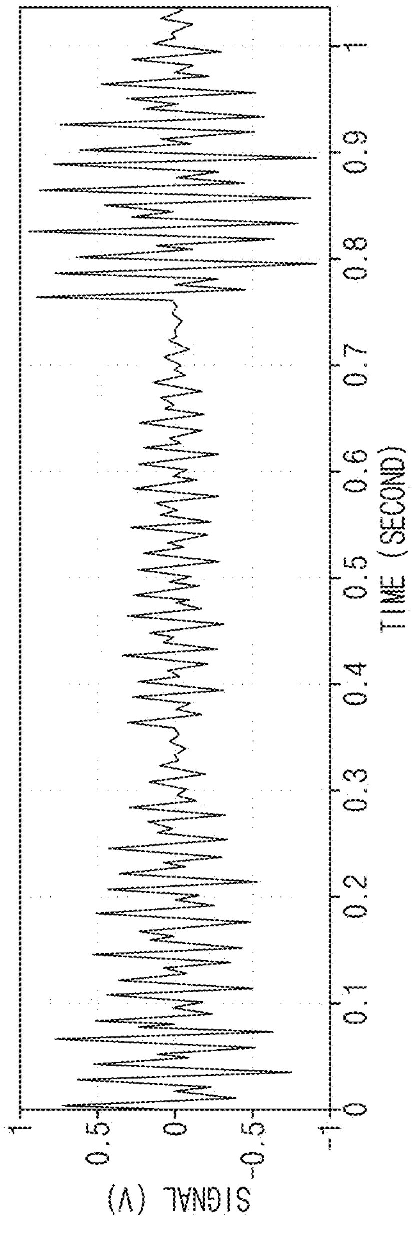
FIG. 8 is a drawing illustrating a haptic signal for a collision effect according to embodiments of the present disclosure.

FIG. 8 is a drawing illustrating a haptic signal for a collision effect according to embodiments of the present disclosure.

Referring to FIG. 8, the waveform of a haptic signal indicates that there are collisions with an obstacle near 0 seconds and 0.8 seconds. The waveform of the haptic signal at a point of 0.4 seconds indicates that there is a small collision after a large collision. The waveform of the haptic signal is uneven due to overlapping sine waveforms, changes in waveform magnitude depending on the amount of shock, and is gradually attenuated according to collision energy.

Figure 9:
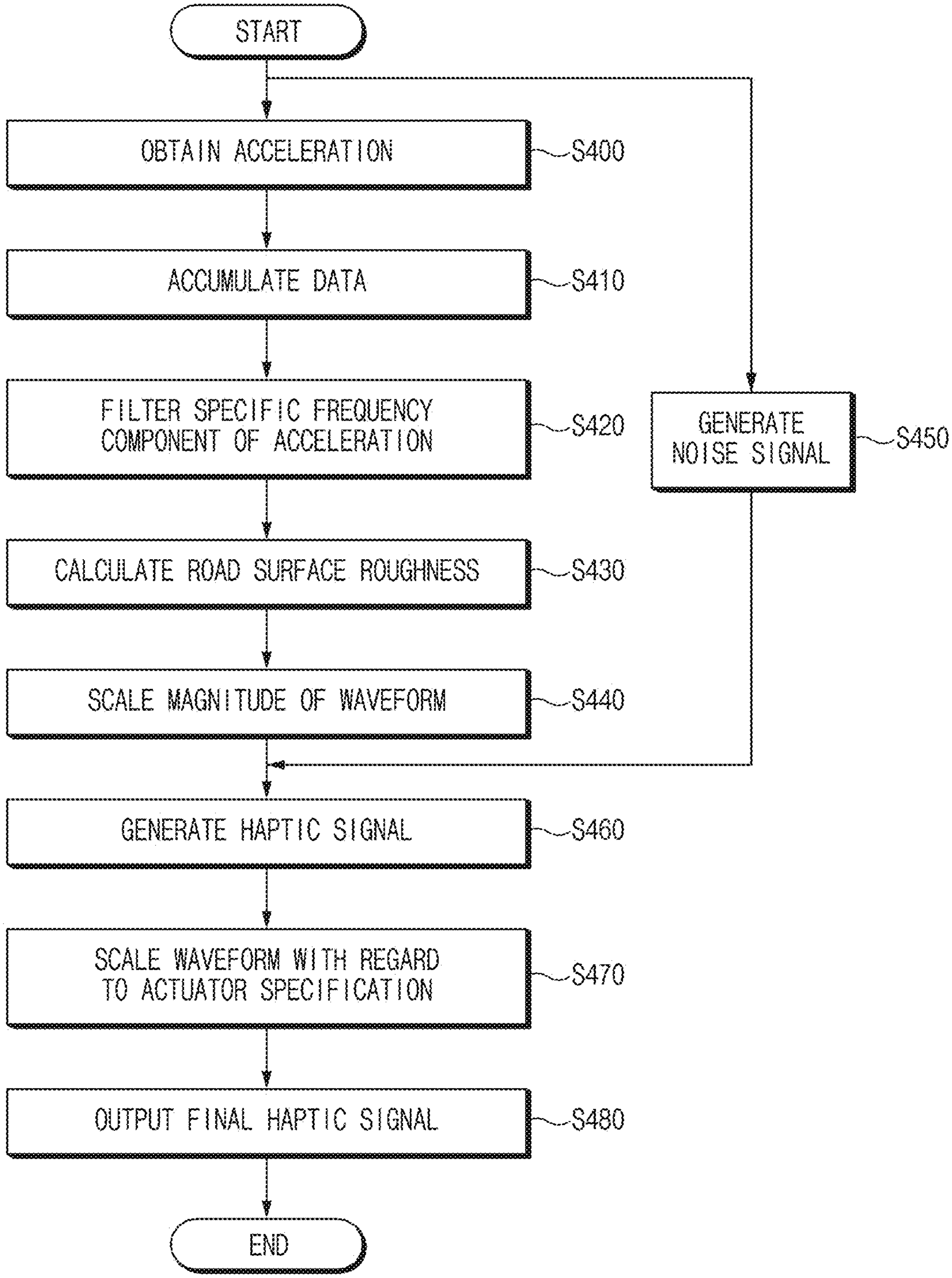
FIG. 9 is a flowchart illustrating a process of generating a haptic signal for a road surface effect according to embodiments of the present disclosure.

FIG. 9 is a flowchart illustrating a process of generating a haptic signal for a road surface effect according to embodiments of the present disclosure.

The haptic feedback control apparatus 200 may generate a haptic signal using a third haptic signal generation algorithm for generating a haptic signal for a road surface using vehicle movement data, such as acceleration.

In S400, the processor 230 of the haptic feedback control apparatus 200 may obtain acceleration. The processor 230 may obtain game data from the game execution device 100. The game data may include vertical axis acceleration.

In S410, the processor 230 may accumulate acceleration data during a predetermined time (e.g., 1 second).

In S420, the processor 230 may filter a specific frequency component from the accumulated acceleration. The processor 230 may filter the specific frequency component of the acceleration using a band-limited filter.

In S430, the processor 230 may calculate road surface roughness r using the filtered acceleration.

In S440, the processor 230 may scale (or determine) a magnitude (or a signal amplitude) of a signal waveform in proportion to the road surface roughness r. It is disclosed in the present embodiment of the present disclosure that the processor 230 maps the magnitude of the signal waveform depending on the road surface roughness, but it is not limited thereto. The processor 230 may map a noise sampling rate, that is, a frequency of a signal depending on the road surface roughness.

In S450, the processor 230 may generate a noise signal. The processor 230 may generate a waveform of an initial haptic signal using the noise signal, such as Perlin noise.

In S460, the processor 230 may generate a haptic signal based on the magnitude of the scaled signal waveform and the generated noise signal.

In S470, the processor 230 may scale a waveform of the generated haptic signal with regard to an actuator specification. The processor 230 may scale the waveform of the haptic signal to a voltage range mapped to the actuator.

In S480, the processor 230 may output the scaled haptic signal as a final haptic signal.

The above-mentioned embodiment is described as, but is not limited thereto, an example of estimating the change in road surface (or the road surface state) using the acceleration. The processor 230 may estimate a road surface state using suspension travel or the like.

Figure 10:
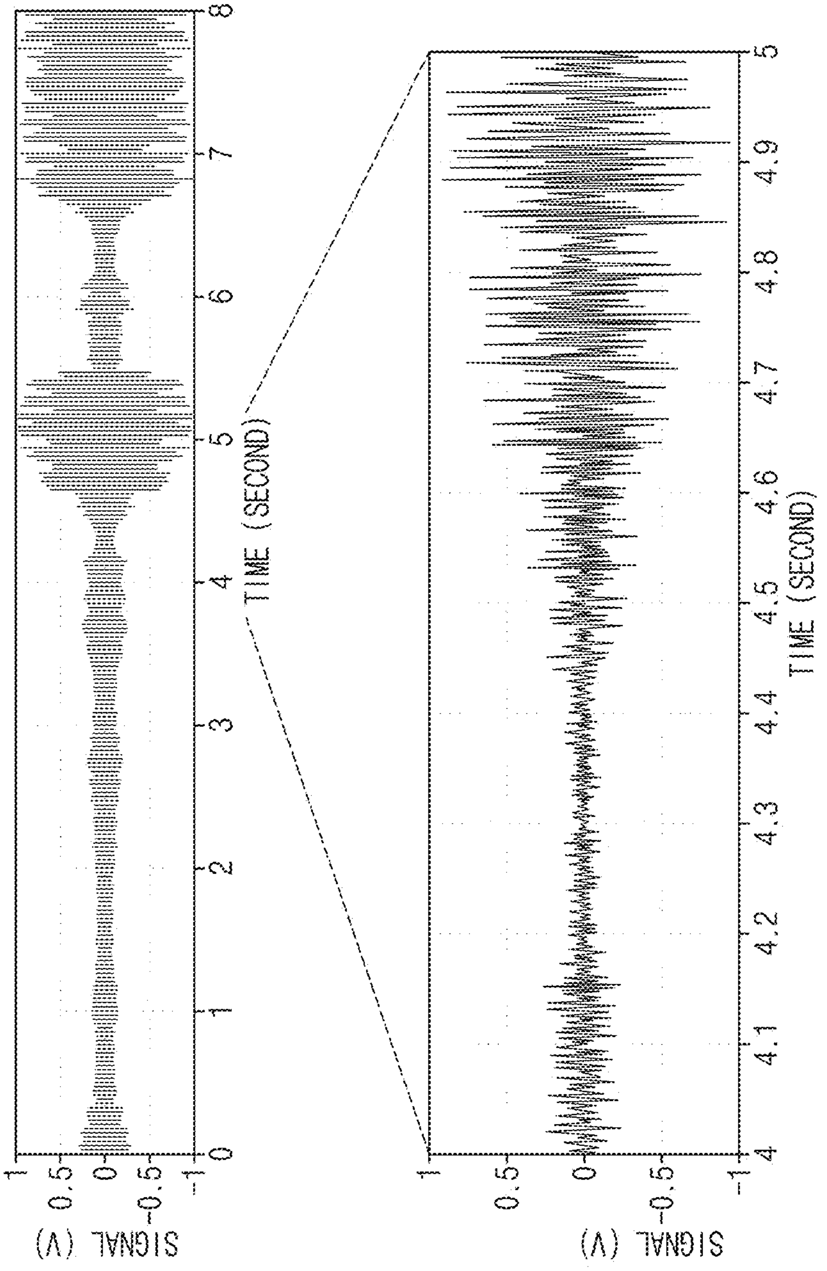
FIG. 10 is a drawing illustrating a haptic signal for a road surface effect according to embodiments of the present disclosure.

FIG. 10 is a drawing illustrating a haptic signal for a road surface effect according to embodiments of the present disclosure.

Referring to FIG. 10, the waveform of a haptic signal indicates that it enters a rough road surface such as grass near 5 seconds and 7 seconds. The waveform of the haptic signal is the noise itself, which indicates that the waveform magnitude is not constant and there is a change in calculated road surface roughness (or road surface roughness). Because road surface roughness is not completely absent on a paved road, such as asphalt, it may show a larger value than "0".

Figure 11:
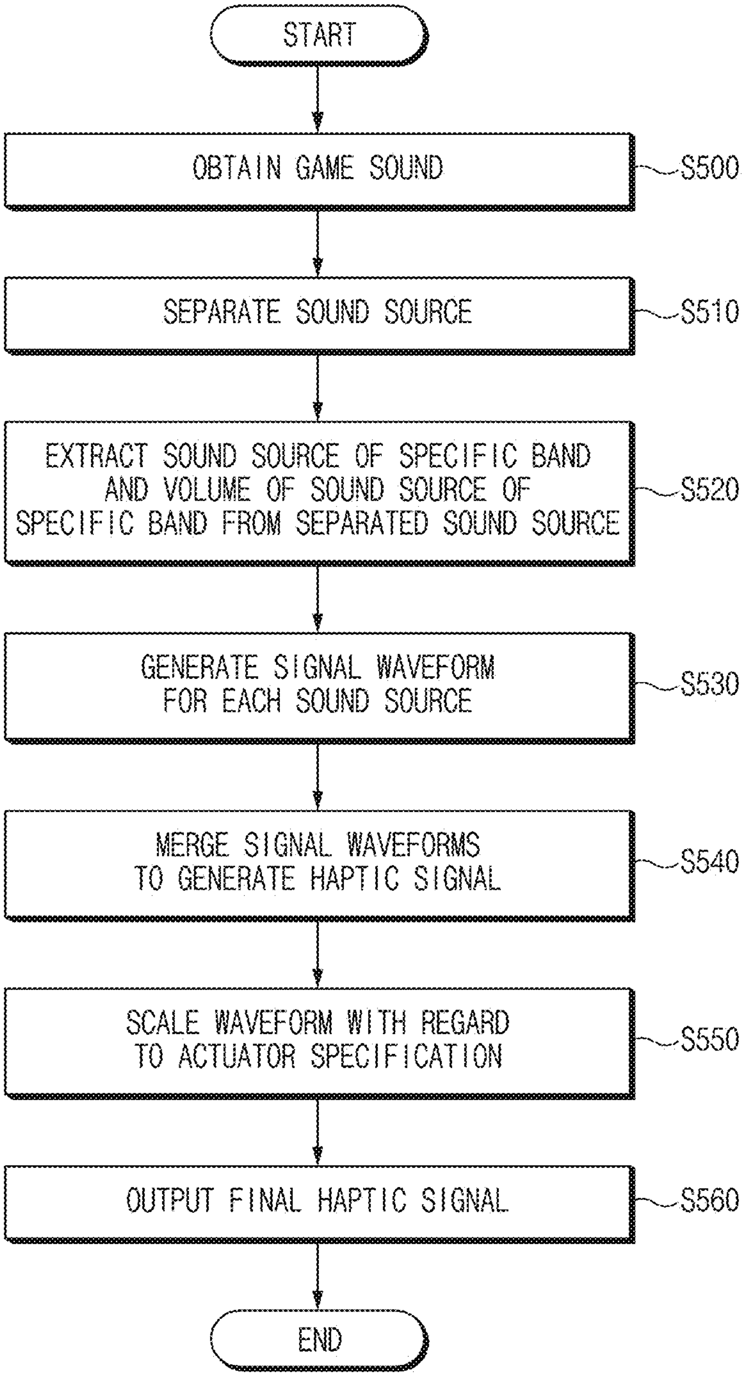
FIG. 11 is a flowchart illustrating a process of generating a haptic signal for a sound-based effect according to embodiments of the present disclosure.

FIG. 11 is a flowchart illustrating a process of generating a haptic signal for a sound-based effect according to embodiments of the present disclosure.

The haptic feedback control apparatus 200 may represent surrounding environment information while a vehicle is traveling as vibration feedback. The haptic feedback control apparatus 200 may generate a haptic signal for a sound-based haptic effect using a fourth haptic signal generation algorithm for generating a sound-based haptic signal using a game sound.

In S500, the processor 230 of the haptic feedback control apparatus 200 may obtain a game sound. The processor 230 may obtain the game sound as game data from the game execution device 100.

In S510, the processor 230 may analyze the game sound and may separate a sound source for each type. The processor 230 may separate the sound source using various schemes, such as a frequency-based analysis scheme or an AI-based analysis scheme. For example, the processor 230 may separate an engine sound, background music, a road surface sound, a wind sound, a collision sound, and the like from the game sound.

In S520, the processor 230 may extract a sound source of a specific band and volume of the sound source of the specific band from the separated sound source. The processor 230 may extract the sound source of the specific band from the specific sound source (e.g., the background music, the road surface sound, or the wind sound) through band-pass filtering. The processor 230 may generate a vibration signal through band-pass filtering based on an actuator frequency band. Furthermore, the processor 230 may extract the volume of the specific sound source (e.g., the engine sound or the collision sound). The extracted volume may be used to determine the intensity of the vibration.

In S530, the processor 230 may generate a signal waveform based on each of the separated sound sources. Furthermore, the processor 230 may generate a signal waveform based on the volume of the specific sound source (e.g., the road surface sound or the wind sound). The processor 230 may generate a signal waveform using a final haptic signal waveform generated by a haptic signal generation algorithm for an engine effect and the extracted volume of the engine sound. The processor 230 may generate a signal waveform using a final haptic signal waveform generated by a haptic signal generation algorithm for a collision effect and the extracted volume of the collision sound.

In S540, the processor 230 may merge the generated signal waveforms depending on a predetermined ratio to generate a haptic signal.

In S550, the processor 230 may scale a waveform of the generated haptic signal with regard to an actuator specification. The processor 230 may calculate an amplitude of the haptic signal, that is, vibration intensity, using Equation 4 below.

$$\text{Vibration intensity} = \frac{\text{Current volume}}{\text{Maximum volume}} \times \frac{\text{Current speed}}{\text{Maximum speed}} \quad \text{Equation 4}$$

In S560, the processor 230 may output the scaled haptic signal as a final haptic signal.

Figure 12:
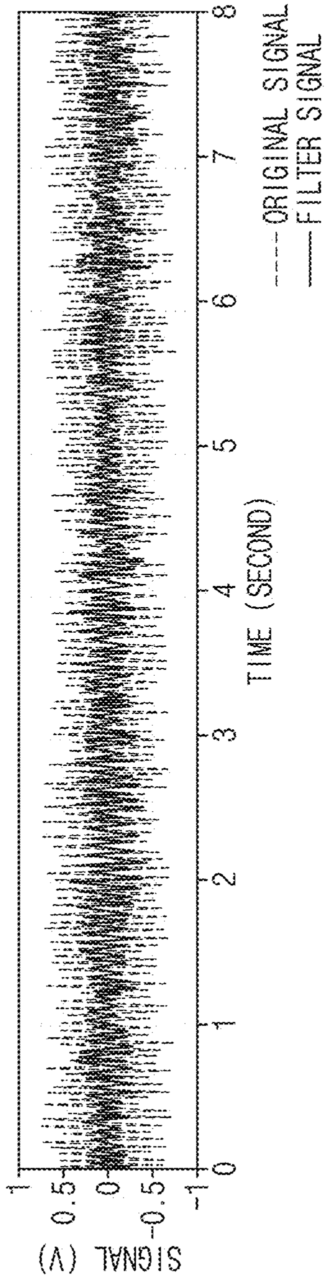
FIG. 12 is a drawing illustrating a haptic signal for a sound-based effect according to embodiments of the present disclosure.

FIG. 12 is a drawing illustrating a haptic signal for a sound-based effect according to embodiments of the present disclosure.

Referring to FIG. 12, a waveform of the haptic signal indicates including various sound sources to drive a vibrator. The waveform of the haptic signal indicates filtering a sound signal to suit a vibrator specification.

Figure 13:
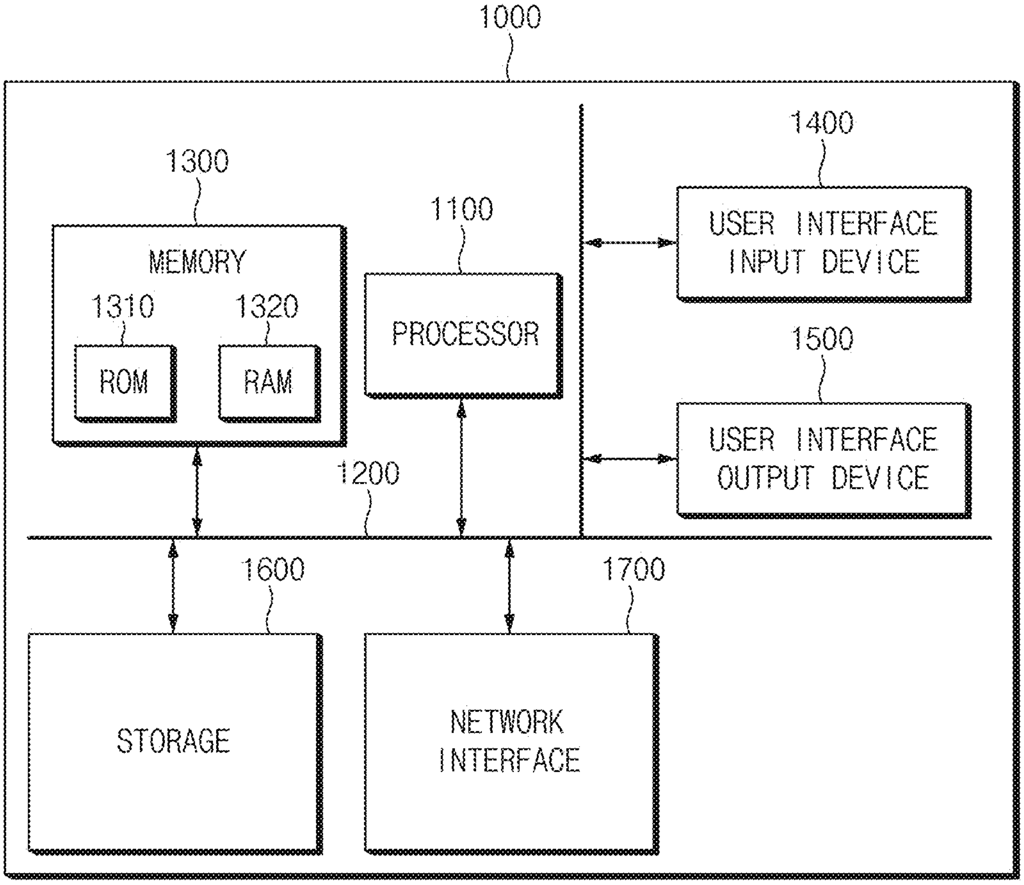
FIG. 13 is a block diagram illustrating a computing system for executing a haptic feedback control method according to embodiments of the present disclosure.

FIG. 13 is a block diagram illustrating a computing system for executing a haptic feedback control method according to embodiments of the present disclosure.

Referring to FIG. 13, a computing system 1000 may include at least one processor 1100, a memory 1300, a user interface input device 1400, a user interface output device 1500, a storage (i.e., a memory) 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Embodiments of the present disclosure may control haptic feedback output to the seat based on game data, thus improving the immersion of the user for a game.

Furthermore, embodiments of the present disclosure may provide force feedback in the form of the feeling of hitting as well as vibration feedback, thus allowing the user to enjoy a more realistic game.

Furthermore, embodiments of the present disclosure may provide an entertainment effect using haptic feedback to allow a passenger to enjoy a more realistic and fun racing game when the passenger plays the racing game in an autonomous vehicle or an electric vehicle, when the autonomous vehicle is traveling for a long time, or when the electric vehicle is stopped for a long time to charge the electric vehicle.

Hereinabove, although embodiments of the present disclosure have been described with reference to exemplary embodiments and the accompanying drawings, the present disclosure is not limited thereto, but it may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but they are provided only for illustrative purposes. The scope of the present disclosure should be construed on the basis of the accompanying claims, and all the technical ideas within the scope equivalent to the claims should be included in the scope of the present disclosure.

What is claimed is:

1. A haptic feedback control apparatus, the apparatus comprising:
- a data acquisition device;
- one or more processors; and
- a non-transitory storage device storing a program comprising instructions that, when executed by the one or more processors, cause the one or more processors to:
  - obtain game data using the data acquisition device;
  - determine a rate of change of acceleration based on the game data;
  - identify a collision event based on the determined rate of change of acceleration;
  - generate a haptic signal based on the identified collision event; and
  - control a first actuator, a second actuator, or both the first actuator and the second actuator mounted in a seat based on the haptic signal to provide haptic feedback.

2. The apparatus of claim 1, wherein the first actuator is mounted in a back seat of the seat in a cantilever structure and is configured to output force feedback in a direction parallel to a direction of progress of a vehicle.

3. The apparatus of claim 2, wherein the first actuator has a vibration displacement determined by a resonant frequency of a cantilever beam to which the first actuator is attached.

4. The apparatus of claim 1, wherein the second actuator is mounted in a cushion seat of the seat and is configured to output vibration feedback in a vertical direction.

5. The apparatus of claim 1, wherein the program further includes instructions to:
- calculate an engine sound frequency using engine revolutions per minute (RPM) included in the game data;
- in response to the engine sound frequency being greater than or equal to a first reference frequency, determine a vibration intensity based on the engine RPM; and
- generate a sine waveform based on the vibration intensity.

6. The apparatus of claim 5, wherein the program further includes instructions that cause the one or more processors to:
- in response to the engine sound frequency being less than the first reference frequency and greater than or equal to a second reference frequency, determine a vibration frequency based on the engine RPM; and
- generate the sine waveform based on the vibration frequency.

7. The apparatus of claim 6, wherein the program further includes instructions that cause the one or more processors to generate the sine waveform based on the engine sound frequency in response to the engine sound frequency being less than the second reference frequency.

8. The apparatus of claim 7, wherein the program further includes instructions that cause the one or more processors to:

limit a previously generated white noise signal to a frequency band of the engine sound frequency; and generate the haptic signal based on the limited white noise signal and the sine waveform.

9. The apparatus of claim 1, wherein the program further includes instructions that cause the one or more processors to:

determine jerk as the rate of change of acceleration and an acceleration magnitude using 3-axis acceleration included in the game data;

calculate a collision intensity based on the acceleration magnitude in response to an identification of the collision event; and generate the haptic signal based on the collision intensity.

10. The apparatus of claim 1, wherein the program further includes instructions that cause the one or more processors to:

calculate road surface roughness using vertical axis acceleration included in the game data;

determine a signal amplitude based on the road surface roughness; and generate the haptic signal based on the signal amplitude and a previously generated noise signal.

11. The apparatus of claim 1, wherein the program further includes instructions that cause the one or more processors to:

separate a sound source for each type from a game sound included in the game data;

generate signal waveforms based on the separated sound source; and merge the generated signal waveforms at a predetermined ratio to generate the haptic signal.

12. A haptic feedback control method, the method comprising:

obtaining game data using a data acquisition device;

determining a rate of change of acceleration based on the game data;

identifying a collision event based on the determined rate of change of acceleration;

generating a haptic signal based on the identified collision event; and controlling a first actuator, a second actuator, or both the first actuator and the second actuator mounted in a seat based on the haptic signal to provide haptic feedback.

13. The method of claim 12, wherein providing the haptic feedback comprises:

controlling the first actuator mounted in a back seat of the seat in a cantilever structure to output force feedback in a direction parallel to a direction of progress of a vehicle; and controlling the second actuator mounted in a cushion seat of the seat to output vibration feedback in a vertical direction.

14. The method of claim 12, wherein generating the haptic signal comprises:

calculating an engine sound frequency using engine revolutions per minute (RPM) included in the game data;

in response to the engine sound frequency being greater than or equal to a first reference frequency, determining a vibration intensity based on the engine RPM; and generating a sine waveform based on the vibration intensity.

15. The method of claim 14, wherein generating the haptic signal further comprises:

in response to the engine sound frequency being less than the first reference frequency and greater than or equal to a second reference frequency, determining a vibration frequency based on the engine RPM; and generating the sine waveform based on the vibration frequency.

16. The method of claim 15, wherein generating the haptic signal further comprises generating the sine waveform based on the engine sound frequency in response to the engine sound frequency being less than the second reference frequency.

17. The method of claim 16, wherein generating the haptic signal further comprises:

limiting a previously generated white noise signal to a frequency band of the engine sound frequency; and generating the haptic signal based on the limited white noise signal and the sine waveform.

18. The method of claim 12, wherein generating the haptic signal comprises:

determining jerk as the rate of change of acceleration and an acceleration magnitude using 3-axis acceleration included in the game data;

in response to an identification of the collision event, calculating a collision intensity based on the acceleration magnitude; and generating the haptic signal based on the collision intensity.

19. The method of claim 12, wherein generating the haptic signal comprises:

calculating road surface roughness using vertical axis acceleration included in the game data;

determining a signal amplitude based on the road surface roughness; and generating the haptic signal based on the signal amplitude and a previously generated noise signal.

20. The method of claim 12, wherein generating the haptic signal comprises:

separating a sound source for each type from a game sound included in the game data;

generating signal waveforms based on the separated sound source; and merging the generated signal waveforms at a predetermined ratio to generate the haptic signal.

* * * * *